June 3, 1952  R. H. KUNTZ  2,599,398
AIR REGULATOR VALVE
Filed Oct. 17, 1950  2 SHEETS—SHEET 2
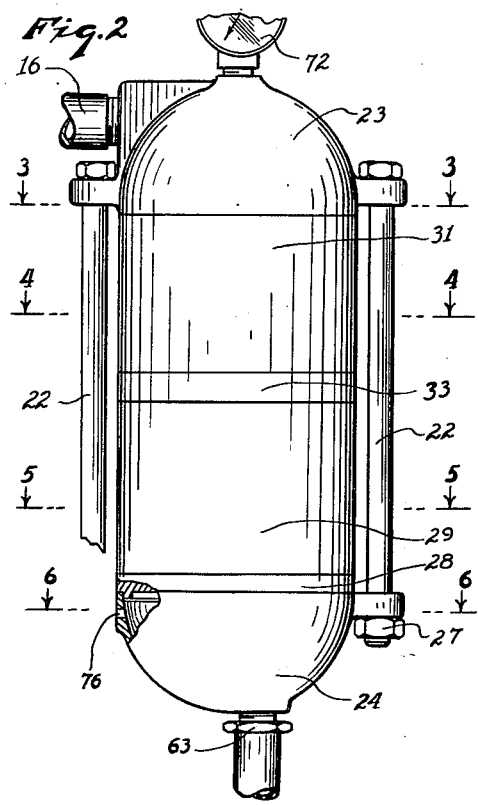
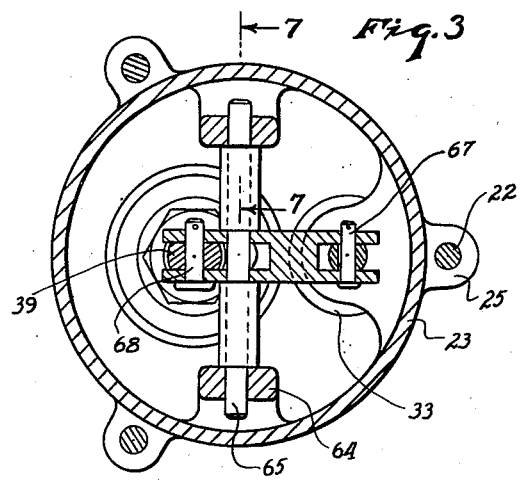
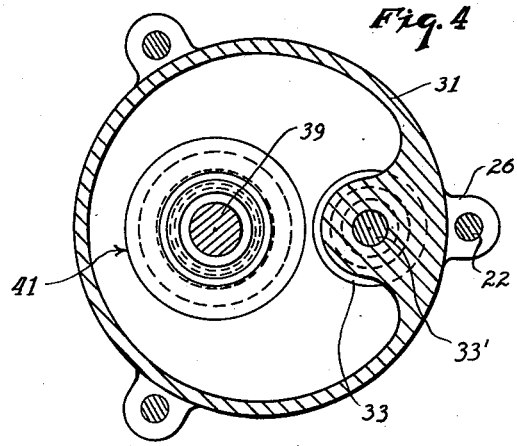
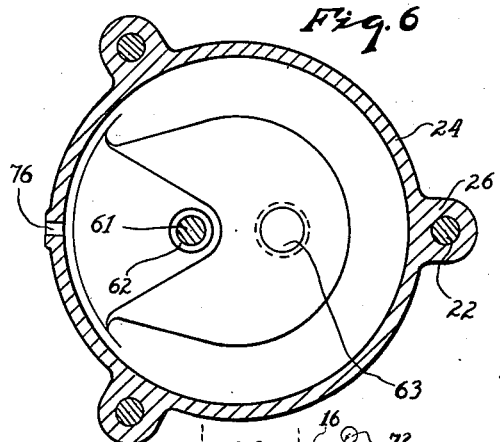
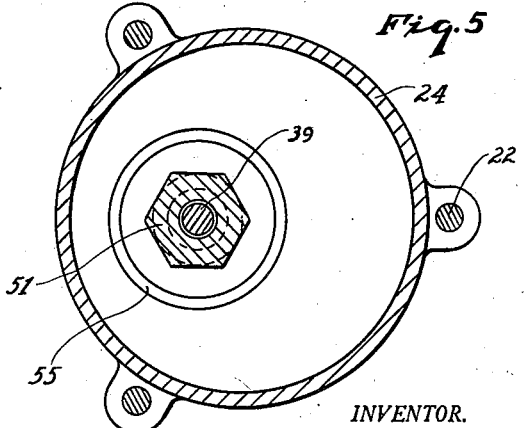
INVENTOR.
ROBERT H. KUNTZ
BY
L. S. Saulsbury
ATTORNEY Patented June 3, 1952

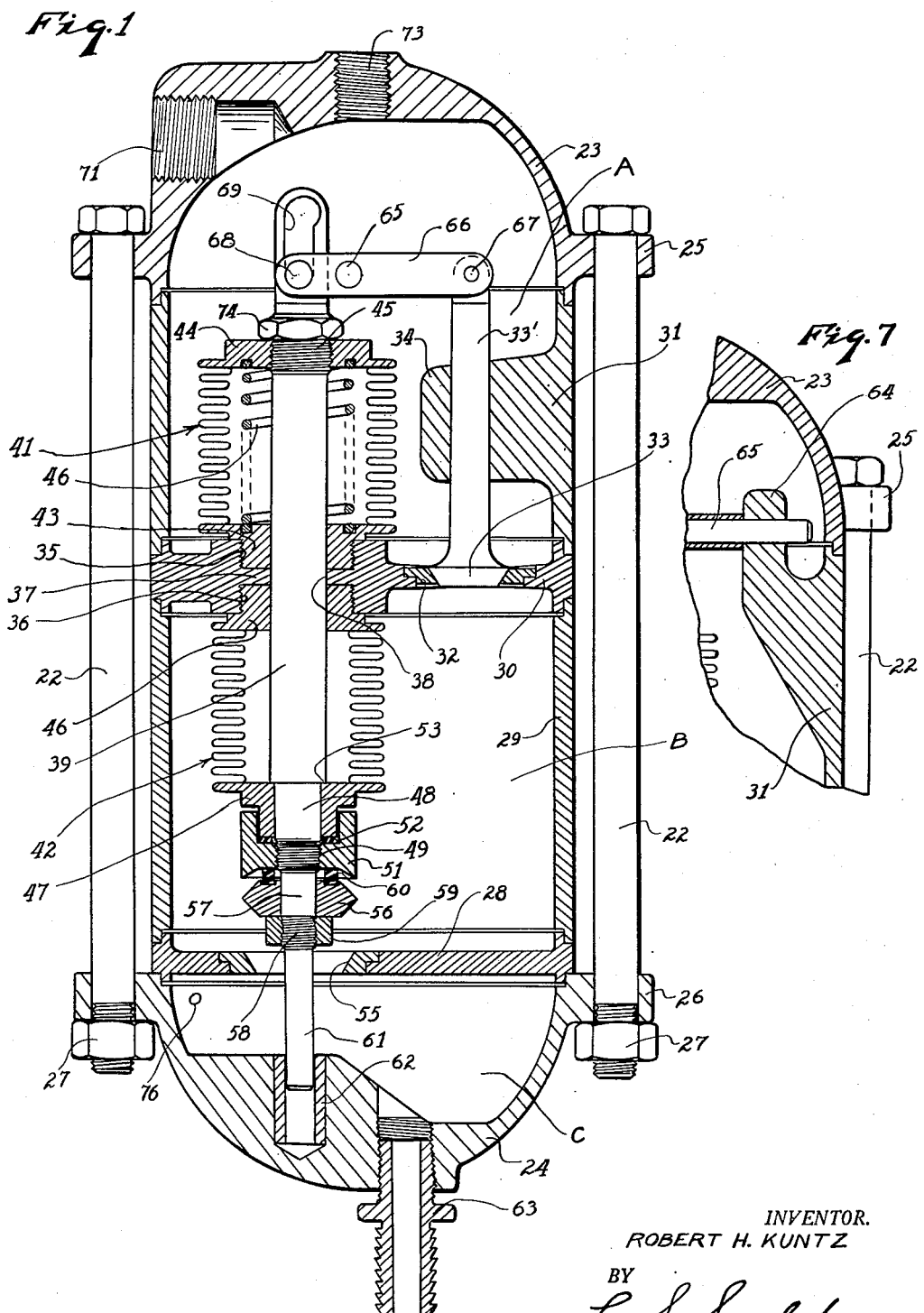

2,599,398

UNITED STATES PATENT OFFICE 2,599,398

AIR REGULATOR VALVE

Robert H. Kuntz, Carbondale, Ill.

Application October 17, 1950, Serial No. 190,566

5 Claims. (Cl. 230—89)

This invention relates to an air regulator valve for water supply systems.

It is an object of the present invention to provide an efficient air regulating valve for maintaining the required air pressure in the water tank of a water supply system.

It is another object of the present invention to provide an air regulator valve for controlling the air pressure in a water supply tank through which a discharge of air can be made so that the level of the water in the tank can, through this air regulator valve, be held at a given height and the proper amount of the air and of the water thereby be governed.

It is another object of the invention to provide a valve which will control the volume of air within the water supply tank whereby sufficient air dome will be available to supply the necessary pressure to the water and sufficient liquid will be maintained in the tank to supply peak loads and whereby a constant delivery of water to the line is assured.

Other objects of the present invention are to provide an air regulator valve for a water supply system which is of simple construction, inexpensive to manufacture, has a minimum number of parts, easy to install, compact, easy to clean and maintain, comprises stacked assembled parts, automatic and efficient in operation.

For other objects and for a better understanding of the invention, reference may be had to the following detailed description taken in connection with the accompanying drawing, in which Fig. 1 is a vertical view of the air regulator valve embodying the features of the present invention.

Fig. 2 is a fragmentary side elevational view of the valve with portions broken away.

Figs. 3, 4, 5 and 6 are respectively transverse sectional views taken respectively at different elevations in Fig. 2 and generally on lines 3—3, 4—4, 5—5 and 6—6 thereof.

Fig. 7 is a fragmentary vertical sectional view taken on line 7—7 of Fig. 3.

Fig. 8 is a diagrammatic illustrative view of the water supply system of which the air regulator valve of the present invention is a part.

Referring now particularly to Fig. 8, there is shown the water system in which this air regulating valve is used. A pump 10 draws water through a pipe 11 from a well 12 and delivers it through a pipe 13 to a water storage tank 14. An air regulator valve 15 embodying the features of the present invention is connected to the water storage tank by a pipe 16 at about two thirds the distance from the bottom of the tank to the top thereof. The air regulator valve has an outlet 17 through which surplus water can pass to a drain 18 or, if desired, this outlet pipe 17 can extend, as indicated at 17', to return such water to the well 12. A pressure switch 19 for a small system may be set to start the pump 10 when the pressure in the storage tank 14 is twenty pounds per square inch and will stop the pump when the pressure has reached forty pounds per square inch. Water is drawn from the tank through a service line 21 and may reduce the pressure in the storage tank 14 to twenty pounds per square inch. The pump will start again to replenish the tank with water and to build up the pressure. During these cycles there is some loss of air from the storage tank 14.

With the air regulator valve 15, the correct amount of air will be maintained in the tank at all times.

The air regulator valve 15 is formed of sections arranged in stack formation and held in place by long connecting bolts 22 circumferentially spaced around the exterior of the valve parts and top and bottom heads 23 and 24, the bolts extending respectively through bosses 25 and 26 of the respective heads. Each bolt 22 has a nut 27.

Between the top and bottom head members are stacked a bottom valve section 28, a cylindrical spacing section 29, a top valve section 30 and a cylindrical spacing and valve guiding member 31. The ends of all of these members may be recessed to overlap one another and to have an air tight fit. The valve section 30 has a valve seat 32 fitted therein with which a valve 33 having an upwardly extending shank 33', may seat. The shank 33' is guided in a radially inwardly extending boss 34 of the spacing member 31.

The valve section 30 has threaded recesses 35 and 36 on the opposite sides of the same and separated by a partition 37 through which extends a hole 38. A main shaft 39 is adjustable through the hole 38 and surrounding this shaft 39 and secured within the respective threaded recesses 35 and 36 are bellows units 41 and 42.

The bellows unit 41 has a threaded head 43 which threads with the recess 35 and an upper head 44 that has a threaded opening through which main shaft 39 extends. The shaft 39 is threaded, as indicated at 45, to receive the head 44. Between the heads 43 and 44 is a heavy spring 46. This spring surrounds the main shaft 39 and lies within the bellows unit 41. The heads 43 and 44 are respectively recessed to receive the ends of the spring 46. This spring urges the upward movement of the main shaft.

The bellows unit 42 includes a head 46 that engages with the threaded recess 36 of the valve plate section 30 and a head 47 that is shouldered on the main shaft 39. This head 47 surrounds a reduced portion 48 of the main shaft which is threaded at 49. A nut 51 is adjustable upon the threads 49 and engages a sealing washer 52 to retain the head member 47 against shoulder 53 of the main shaft.

The lower valve section 28 has a removable valve seat 55 with which a valve element 56 cooperates to seal off spaces on the opposite sides of the valve section 28. The main shaft 39 has a further reduced section 57 which carries the valve element 56 and which has a threaded formation 58. A nut 59 secures the valve element 56 and the sealing washer 60 against the nut 51. The main shaft 39 further has an extension 61 that is adjustable in a bushing 62 in the bottom head 24. The bottom head 24 has an outlet in which is fixed a nipple 63.

Also on the spacing member or section 31 are upstanding bosses 64 that extend upwardly into the top member 23, Fig. 7, and are located diametrically opposite from each other. A shaft 65 extends between these bosses and on this shaft is a rocker arm 66 that is pivotally connected by a pivot pin 67 to the upper end of the shank 33' of the valve element 33. The opposite end of the rocker 66 is connected by a pin 68 to the upper end of the main shaft 39. An elongated slot 69 is provided in the shaft 39 and the pin 68 is adjustable therein. When the main shaft 39 is elevated, the pin 68 will abut the lower end of the slot 69 and cause the rocker 66 to turn in a clockwise direction about the pivot pin 65 so as to positively seat valve 33 in the valve seat 32.

When the main shaft 39 is lowered to seat valve 56 on valve seat 55 and the pin 68 of the rocker 66 lies in the upper end of the slot 69, the valve 33 is free to open. The top head 23 has a threaded opening 71 for receiving the pipe connection 16. A pressure gauge 72, Figs. 2 and 8, can be secured to a threaded opening 73 in the top head 23. The upper head 44 of the bellows unit 41 is held in place by a lock nut 74 adjustable on the threads 45 of the main shaft 39.

The various sections of the air valve provide three chambers, indicated generally at A, B and C. When the tank pressure is twenty pounds per square inch, valve 33 will be closed and the valve 56 will be elevated. An air vent hole 76 in the head 24 provides atmospheric pressure to the chamber C and with the valve 56 being lifted and the valve 33 closed, the chamber B will also be at atmospheric pressure.

When the pressure in the water storage tank 14 rises to twenty-five pounds per square inch, the spring 46 and the bellows unit 41 are compressed and valve 56 will be closed and the valve 33 will be opened. As the water in the storage tank rises to the air regulator connection 16, water enters the air valve 15 and passes valve element 33 and fills chamber B. As the pressures in the tank and chamber B equalize, air which is in chamber B goes into the storage tank through the open valve space 33. When the pressure in the tank 14 returns to twenty pounds per square inch, valve 33 closes and the valve 56 opens. Water is permitted to discharge from chamber B to chamber C which is vented by air hole 76 and accordingly chamber B is allowed to fill again with air.

The water, on leaving the bottom head 24, passes through nipple 63 and into the hose 17 where it is discharged either into the drain 18 or returned to the well 12, as shown in Fig. 8. The amount of this water is only slight.

When the water in the tank 14 does not rise high enough to enter the valve connection 16, there is too much air in the tank and the air in chamber B of the air regulator will be discharged instead of water. The air regulator valve is not dependent upon the pump to operate the same. It operates in response to the high and low pressures in the tank and is accordingly operated independently of the pump.

It will be apparent that the valve does not have a float or rubber diaphragm and that all of the moving parts are moved under the action of pressure and are thus positively operated. The arrangement is such that the valve element 56 will close slightly ahead of the valve 33.

While various changes may be made in the detail construction, it shall be understood that such changes shall be within the spirit and scope of the present invention as defined by the appended claims.

What is claimed is:

1. An air regulator for a water storage system, including a water tank, said regulator comprising top and bottom head members, a stack of alternate valve and cylindrical spacing sections disposed between the head members, means extending between the head members to retain the stack sections in assembled relationship, one of said valve plate sections having a valve seat therein providing for an opening, the other of said plate sections having a valve seat therein providing an opening therethrough, said stacked sections and the head members providing chambers for the reception of air or water, valve elements associated with the respective valve seats of the valve plate sections, means extending between the valve elements and responsive to the air pressure of the water tank for opening one valve and closing the other valve, or vice versa, said bottom head member having vent means for receiving air under atmospheric pressure and having a water outlet drain.

2. An air regulator valve for water storage systems comprising top and bottom head members, a stack of alternate valve plate and spacer sections disposed between the head members, means securing the head members together and holding the sections in stacked relationship, the lower plate section having a valve seat therein providing an opening from one side to the other, the upper valve plate section having a narrow valve seat therein providing an opening from one side thereof to the other, a main shaft slidable through the upper valve plate section, a valve element on the lower end of the shaft adapted to cooperate with the valve seat in the lower valve plate section to close off the opening therethrough, a valve element adjustable in the upper spacing section and adapted to cooperate with the valve seat in the upper valve plate section, linkage means extending between the last mentioned valve element and the main shaft so that the main shaft upon moving downwardly to seat the valve thereon causes the second mentioned valve to be lifted or vice versa, and means lying above the second valve plate section and associated with the main shaft and responsive to the air pressure in the top of the valve to effect the actuation of the main shaft and the valve elements, said bottom head member having a vent opening and a water drain.

3. An air regulator for a water storage system, including a water tank, said regulator comprising a casing having upper and lower valve seat plate portions, valve seats disposed respectively in the valve seat plate portions and providing openings between the opposite sides of the portion, said portions dividing the casing into spaces, a main shaft adjustable through the upper plate portion, bellows units disposed respectively on the opposite sides of the upper plate portion and surrounding said main shaft, a valve on the lower end of the main shaft adapted to cooperate with the valve seat in the lower plate portion, said upper bellows unit having a spring urging the expansion of the bellows unit and the raising of the main shaft and the valve element thereupon, a second valve element cooperating with the valve seat of the upper plate portion, a rocker device pivotally connected to the casing and having its respective ends connected to the main shaft and the upper valve element respectively, said main shaft being movable downwardly in response to an increased pressure in the upper space and thereby serving to lift the second mentioned valve element while effecting the closing of the valve element on the lower end of the main shaft with the valve seat in the lower valve seat plate portion, said casing having an opening for the attachment of the casing with the water storage tank and its lower end a drain opening.

4. An air regulator for a water storage system, including a water tank, said regulator comprising a casing having upper and lower valve seat plate portions, valve seats disposed respectively in the valve seat plate portions and providing openings between the opposite sides of the portions, said portions dividing the casing into spaces, a main shaft adjustable through the upper plate portion, bellows units disposed respectively on the opposite sides of the upper plate portion and surrounding said main shaft, a valve on the lower end of the main shaft adapted to cooperate with the valve seat in the lower plate portion, said upper bellows unit having a spring urging the expansion of the bellows unit and the raising of the main shaft and the valve element thereupon, a second valve element cooperating with the valve seat of the upper plate portion, a rocker device pivotally connected to the casing and having its respective ends connected to the main shaft and the upper valve element respectively, said main shaft being movable downwardly in response to an increased pressure in the upper space and thereby serving to lift the second mentioned valve element while effecting the closing of the valve element on the lower end of the main shaft with the valve seat in the lower valve seat plate portion, said casing having an opening for the attachment of the casing with the water storage tank and in its lower end a drain opening, and said main shaft having a depending extension, a bushing in the lower end of the casing slidably receiving said extension, said upper plate portion having threaded recesses on the opposite sides thereof, said shaft adjustable through the recesses, each of said bellows units having a threaded head member, the head members of the units respectively threadedly engaging with the threaded recesses of the valve seat plate portion.

5. An air regulator for water storage systems comprising upper and lower head members, a stack of alternate valve seat plate and cylindrical spacer sections disposed between the head members, means extending between the head members and retaining said sections in stacked relationship therebetween, said valve seat plate sections having valve seats therein providing for an opening between the opposite sides of the sections, said plate sections forming with the head members three spaces, the lower head member having vent means therein, the upper plate section having threaded recesses on the opposite sides thereof and providing a partition with an opening therein lying between the recesses, a self-contained bellows unit threaded into the upper recess, a main shaft adjustable through the opening in the partition and extending through the upper bellows unit, said upper bellows unit including a spring adapted to urge the expansion of the bellows unit and to lift the shaft, a second bellows unit connected to the bottom threaded recess and surrounding said shaft, a valve element on the lower end of the shaft adapted to cooperate with the valve seat in the lower plate section, said main shaft having an extension extending downwardly through the lower plate section, said bottom head member having a bushing slidably receiving said extension, a valve element adapted to be seated in the valve seat of the upper valve seat plate section, means on the spacer section thereabove for guiding the movement of said last mentioned valve, said upper spacer section having upwardly extending projections, a shaft extending between the projections, a rocker arm pivoted on said shaft, said rocker arm being connected to the second mentioned valve element, said main shaft having an elongated slot therein, a pin extending from the opposite end of the rocker arm into the elongated slot of the main shaft, said upper bellows unit being responsive to the pressure in the upper space whereby to effect the actuation of the main shaft and of the valve element engageable with the valve seat of the upper valve seat plate section whereby to open one valve element and close the other or vice versa.

ROBERT H. KUNTZ.

No references cited.